United States Patent [19]

Kitamoto

[11] Patent Number: 4,876,859

[45] Date of Patent: Oct. 31, 1989

[54] MULTI-TYPE AIR CONDITIONER SYSTEM WITH STARTING CONTROL FOR PARALLEL OPERATED COMPRESSORS THEREIN

[75] Inventor: Manabu Kitamoto, Fuji, Japan

[73] Assignee: Kabushiki Kaisha Toshiba, Kawasaki, Japan

[21] Appl. No.: 225,483

[22] Filed: Jul. 28, 1988

[30] Foreign Application Priority Data

Sep. 10, 1987 [JP] Japan ................................. 62-227311

[51] Int. Cl.$^4$ ............................................. F25B 7/00
[52] U.S. Cl. ..................................... 62/117; 62/175; 62/228.4
[58] Field of Search ............... 62/175, 228.4, 196.2, 62/510, 196.3, 117; 236/1 EA; 417/3

[56] References Cited

U.S. PATENT DOCUMENTS

| | | | |
|---|---|---|---|
| 2,875,592 | 3/1959 | Olsen | 62/470 X |
| 4,102,149 | 7/1978 | Conley et al. | 62/510 X |
| 4,152,902 | 5/1979 | Lush | 62/175 X |
| 4,248,055 | 2/1981 | Day III et al. | 62/196.3 |
| 4,672,822 | 6/1987 | Iijima et al. | 62/510 X |
| 4,720,982 | 1/1988 | Shimizu et al. | 62/204 |
| 4,766,735 | 8/1988 | Gotou | 62/175 |

FOREIGN PATENT DOCUMENTS

54-93207  7/1979  Japan.
62-102046  5/1987  Japan.

*Primary Examiner*—William E. Wayner
*Attorney, Agent, or Firm*—Cushman, Darby & Cushman

[57] ABSTRACT

An outdoor unit includes at least two variable-capacity compressors. Each of a plurality of indoor units includes a detector for detecting an air conditioning load of the indoor heat exchanger to output respective required capacity data. A distribution unit couples the outdoor unit in parallel with the indoor units so as to constitute each refrigerant cycle, and has a plurality of refrigerant flow controllers. A first controller supplies a control command based on the respective required capacity data to the refrigerant flow controllers, and outputs total sum data of the respective required capacity data. A second controllers supplies a single operation command with a predetermined capacity by one of the two compressors or a parallel operation command with predetermined capacities by both the two compressors to the outdoor unit whether the total sum data is smaller or larger than a predetermined value. A third controllers supplies a command for temporarily decreasing the predetermined capacity by one of the two compressors to the outdoor unit when the single operation command is switched to the parallel operation command, and then, supplies a command for starting the other of the two compressors to the outdoor unit.

15 Claims, 6 Drawing Sheets

MULTI-TYPE AIR CONDITIONER SYSTEM WITH STARTING CONTROL FOR PARALLEL OPERATED COMPRESSORS THEREIN

RELATED APPLICATIONS

The subject matter of the present invention is generally related to the subject matter of the following U.S. applications:

| Application No. | Filed | Name of Applicant |
| --- | --- | --- |
| 07/306,074 | February 6, 1989 | KITAMOTO |
| 07/305,906 | February 2, 1989 | KITAMOTO |

The subject matter of the present invention is also generally related to the subject matter of a third invention, which application is to be filed in the U.S. Patent and Trademark Office by Sept. 30, 1989. The third application will bear a reference number of EKI-63P1090-1.

BACKGROUND OF THE INVENTION

1. Field of the Invention

This invention relates to a multi-type air conditioner system with a starting control for parallel operated compressors and, more particularly, to an air conditioner system constituted by a heat pump type refrigeration cycle including an outdoor unit having at least two variable-capacity compressors, and a plurality of indoor units.

2. Description of the Related Art

Generally, in such a multi-type air conditioner system as described above, a single operation using one compressor or a parallel operation using two compressors is performed in accordance with a required capacity of each indoor unit.

In such an air conditioner system, when the single operation using one compressor is switched to the parallel operation using two compressors, the starting load of the second operated compressor is influenced by the delivery pressure of the first operated compressor and is increased. As a result, a starting error may be caused in the second compressor.

In addition, while the second compressor is stopped or its start operating frequency is shifted to a command frequency, the pressure in its case becomes higher than that in the compressor case of the first compressor. For this reason, an effect of equally supplying a refrigeration oil from the first compressor to the second compressor is lost, so that the second compressor may be undesirably locked due to burning caused by a shortage of oil.

SUMMARY OF THE INVENTION

It is therefore an object of the present invention to provide a new and improved multi-type air conditioner system with a starting control for parallel operating compressors, which can reliably and smoothly start the second compressor, thereby constantly realizing a safe operation.

According to the present invention, there is provided a multi-type air conditioner apparatus, comprising:

an outdoor unit having at least two variable-capacity compressors, and an outdoor heat exchanger to which the two compressors are commonly coupled;

a plurality of indoor units, each having at least an indoor heat exchanger and detecting means for detecting an air conditioning load of the indoor heat exchanger, to output required capacity data;

a distribution unit for coupling the outdoor unit in parallel with the plurality of indoor units, so as to constitute each refrigerant cycle, the distribution unit having a plurality of refrigerant flow control means for each refrigerant cycle;

first control means, for supplying a control command based on required capacity data from the plurality of indoor units to the refrigerant flow control means of the distribution unit, and outputting total sum data of the respective required capacity data;

second control means, for supplying a single operation command with a predetermined capacity by one of the two variable-capacity compressors to the outdoor unit when the total sum data from the first control means is smaller than a predetermined value, and supplying a parallel operation command with predetermined capacities by both the two variable-capacity compressors to the outdoor unit when the total sum data is larger than the predetermined value; and third control means, for supplying a command for temporarily decreasing from the predetermined capacity one of the two variable-capacity compressors to the outdoor unit and thereafter supplying a command for starting the other of the two variable-capacity compressors to the outdoor unit when the single operation command supplied from the second control means is switched to the parallel operation command.

According to the above-described arrangement, when the single compressor operation is switched to the parallel compressor operation, the operating frequency of the compressor currently in operation is decreased, and the high-pressure-side pressure in the refrigeration cycle is decreased. Then, the other compressor is started in a state wherein the high-pressure-side pressure is decreased.

Therefore, the second compressor can be reliably and smoothly started, and hence a safe operation can be constantly assured.

BRIEF DESCRIPTION OF THE DRAWINGS

This and other objects and features of the present invention can be understood through the following embodiments, by reference to the accompanying drawings, of which.

DETAILED DESCRIPTION OF THE PREFERRED EMBODIMENT

A first embodiment of the present invention will now be described below, with reference to the accompanying drawings.

Figure 1:
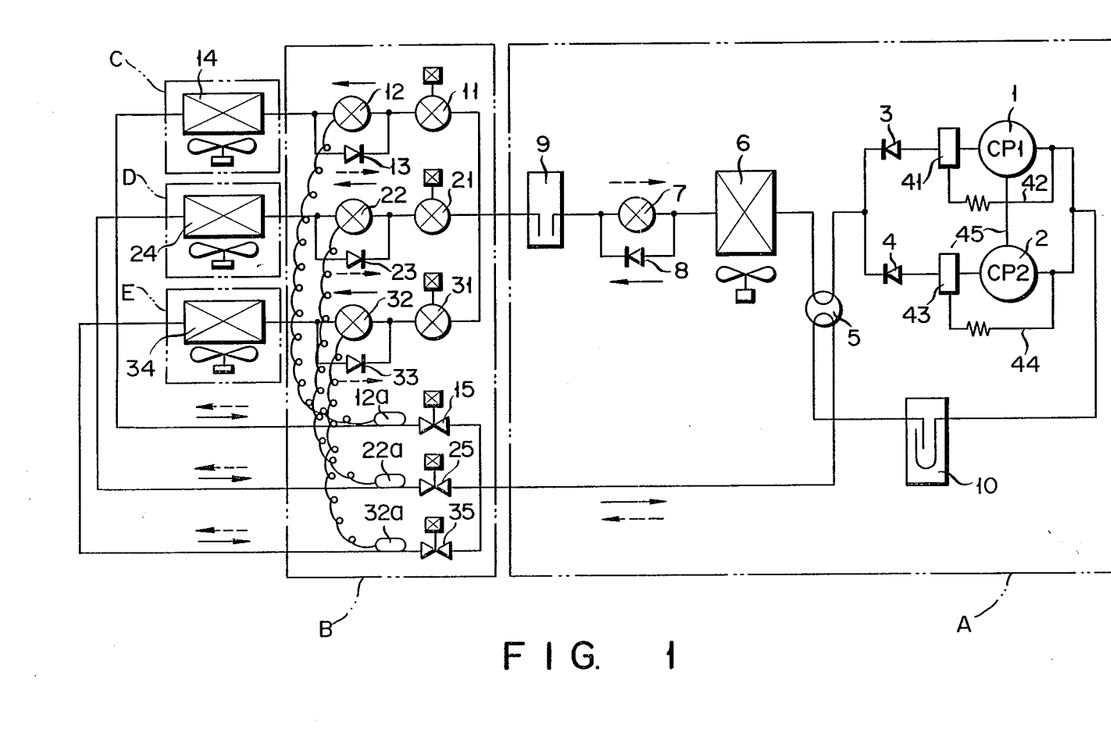
FIG. 1 is a block diagram showing an arrangement of a refrigeration cycle according to a first embodiment of the present invention.

As is shown in FIG. 1, an air conditioner system in this embodiment comprises a heat pump type refrigeration cycle.

Referring to FIG. 1, reference symbol A denotes an outdoor unit; B, a branch unit; and C, D, E, indoor units. Outdoor unit A comprises two variable-capacity compressors 1 and 2, which are connected in parallel through check valves 3 and 4, respectively. Compressors 1 and 2, 4-way valve 5, outdoor heat exchanger 6, a parallel connection of heating expansion valve 7 and cooling cycle check valve, liquid tank 9, electric flow control valves 11, 21, and 31, parallel connections of cooling expansion and heating cycle valves 12, 22, and 32, and 13, 23, and 33, indoor heat exchangers 14, 24, and 34, gas-side valves (solenoid valves) 15, 25, and 35, accumulator 10, and the like, sequentially communicate with each other in the order stated, thereby constituting the heat pump type refrigeration cycle.

Note that cooling expansion valves 12, 22, and 32 include temperature-sensitive cylinders 12a, 22a, and 32a which are respectively attached to the gas-side refrigerant tubes of indoor heat exchangers 14, 24, and 34.

That is, indoor heat exchangers 14, 24, and 34 are arranged in parallel. During the cooling operation, a cooling cycle is formed by causing the refrigerant to flow in the directions indicated by solid arrows in FIG. 1, while during the heating operation, the refrigerant is made to flow in the directions indicated by broken arrows in FIG. 1, upon switching operation of 4-way valve 5, thereby forming a heating cycle.

In such an air conditioner system, the number of compressors 1 and 2 to be operated, and their capacities, are controlled in order to satisfy a required capacity of each indoor unit. At the same time, the opening of each of flow control valves 11, 21, and 31 is controlled so as to adjust the flow rate of refrigerant to each indoor heat exchanger.

In this manner, by suitable use of expansion valves 12, 22, and 32, the degree of overheating of the refrigerant in each indoor heat exchanger can be kept constant and stable, and thus efficient operation achieved regardless of the flow rate of the refrigerant.

Therefore, when the required capacity of each indoor unit is increased during, e.g., the cooling operation, the capacity of compressor 1 is increased, or compressor 2 is started in addition to compressor 1. In this state, if the required capacity of each indoor unit is decreased, the capacity of compressor 2 is decreased, or compressor 2 is stopped and only compressor 1 is operated.

Furthermore, in this embodiment, as shown in FIG. 1, oil separator 41 is attached to the refrigerant delivery-side tube of compressor 1, and oil bypass tube 42 extends from oil separator 41 to the refrigerant intake-side tube of compressor 1. In addition, oil separator 43 is attached to the refrigerant delivery-side tube of compressor 2, and oil bypass tube 44 extends from oil separator 43 to the refrigerant intake-side tube of compressor 2. Bottom portions of compressors 1 and 2 communicate with each other through tube 45 for equally supplying an oil to both the compressors.

Figure 2:
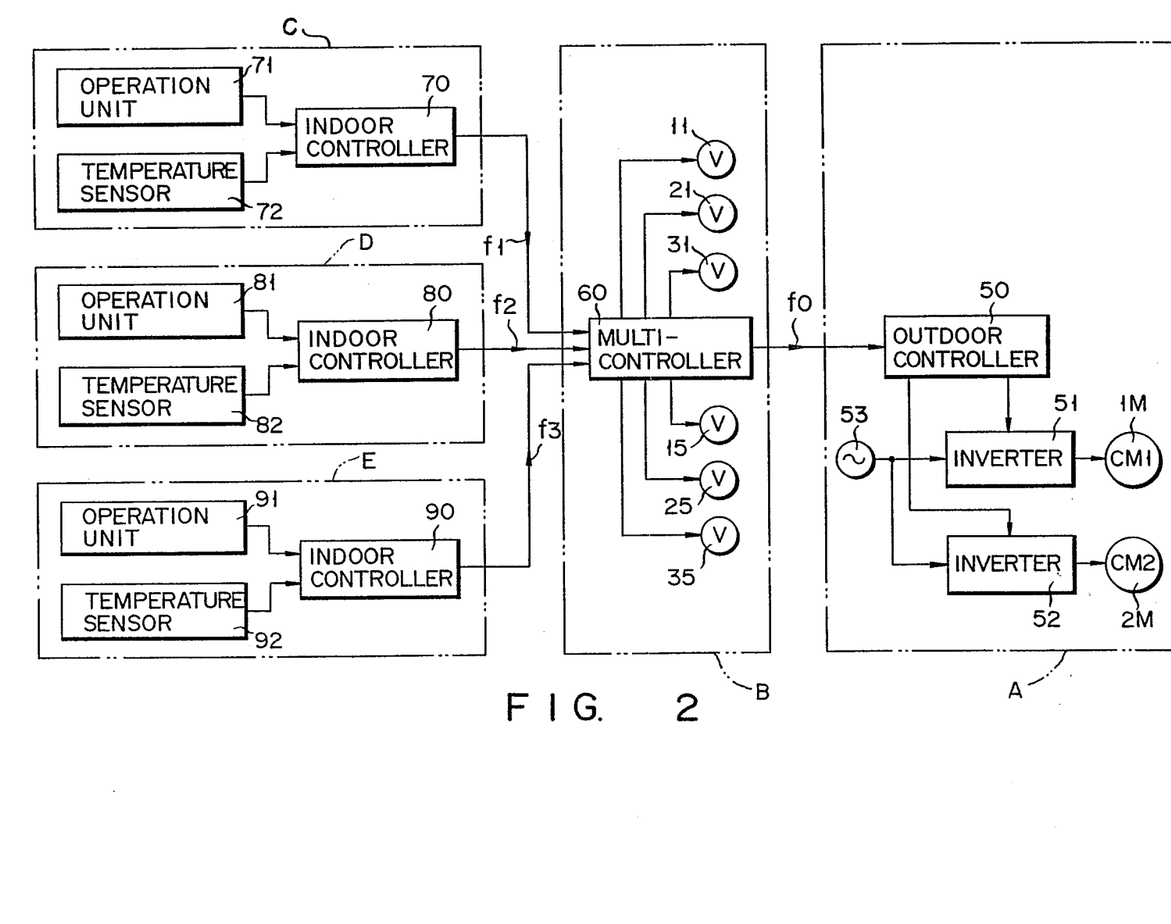
FIG. 2 is a block diagram showing an arrangement of a control circuit of the first embodiment.

FIG. 2 shows a control circuit of this embodiment.

Outdoor unit A comprises outdoor controller 50. Outdoor controller 50 is constituted by a microcomputer and its peripheral circuits. Outdoor controller 50 is connected to external inverters 51 and 52. Inverters 51 and 52 rectify voltages from AC power source 53, convert them into AC voltages having predetermined frequencies by switching operations in accordance with commands from outdoor controller 50, and respectively supply the converted voltages to compressor motors 1M and 2M as drive power.

Branch unit B comprises multi-controller 60. Multi-controller 60 is constituted by a microcomputer and its peripheral circuits. Multi-controller 60 controls flow control valves 11, 21, and 31, and opening/closing valves 15, 25, and 35, which are externally connected to multi-controller 60.

Indoor units C, D, and E comprise indoor controllers 70, 80, and 90, respectively. These indoor controllers are respectively constituted by microcomputers and their peripheral circuits. Operation units 71, 81, and 91, and indoor temperature sensors 72, 82, and 92 are externally connected to indoor controllers 70, 80, and 90, respectively.

Indoor controllers 70, 80, and 90 respectively transmit frequency setting signals f1, f2, and f3 to multi-controller 60 as required capacities. Multi-controller 60 obtains a total sum of the required capacities of the respective indoor units using the transmitted frequency setting signals, and then, transmits frequency setting signal f0 corresponding to the obtained total sum to outdoor controller 50 as a control capacity.

Note that the multi-controller is described in detail in U.S. Pat. No. 4,720,982 assigned to the present applicant.

Figure 3:
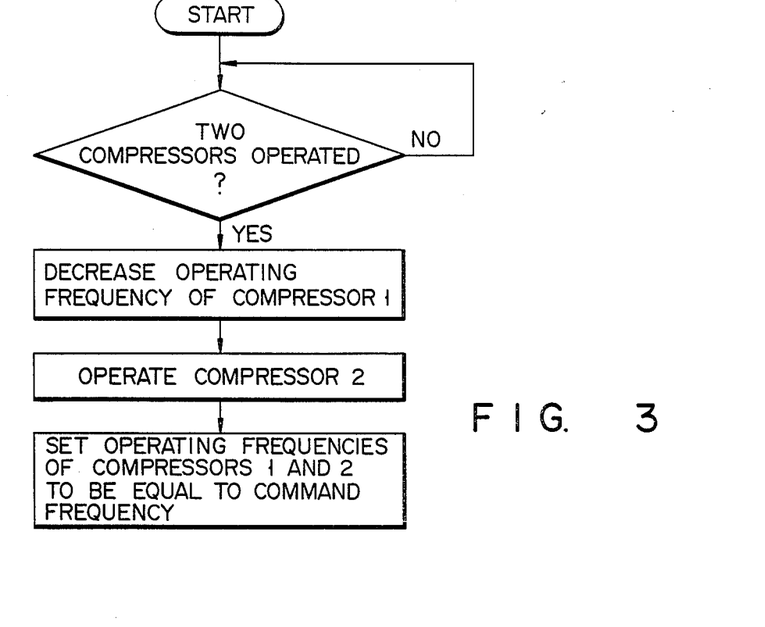
FIG. 3 is a flow chart for explaining an operation of the first embodiment.
Figure 4:
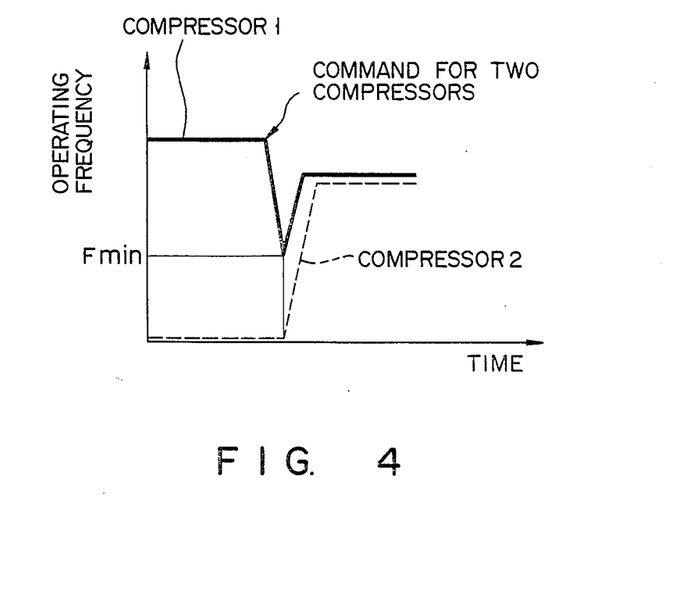
FIG. 4 is a graph showing changes in the operating frequency of the first embodiment.

An operation of the embodiment having the above-described arrangement will be described with reference to FIGS. 3 and 4.

Assume that a cooling operation is performed using all the indoor units. In this case, indoor controller 70 of indoor unit C calculates a difference between a detection temperature obtained by indoor temperature sensor 72 and a set temperature set by operation unit 71, and transmits frequency setting signal f1 corresponding to the calculated difference to multi-controller 60. Similarly, indoor controllers 80 and 90 of indoor units and D and E respectively transmit frequency setting signals f2 and f3 to multi-controller 60 as required cooling capacities.

Multi-controller 60 obtains a total sum of the required cooling capacities of the respective indoor units on the basis of the transmitted frequency setting signals, and then, transmits frequency setting signal f0 corresponding to the obtained total sum to outdoor controller 50 as a control capacity.

Outdoor controller 50 obtains a total sum of the required cooling capacities of the respective indoor units on the basis of the transmitted frequency setting signal f0, and then, controls the number of compressors 1 and 2 to be operated and their capacities in accordance with the total sum.

In this case, outdoor controller 50 shifts the single operation using one compressor to the parallel operation using two compressors as the total sum of the required cooling capacities is increased. When this shifting is performed, first, the operating frequency of compressor 1 (the output frequency of inverter 51) is decreased to predetermined minimum operating frequency Fmin. Compressor 2 is started while the operating frequency of compressor 1 is decreased. Then, the operating frequencies (the output frequencies of inverters 51 and 52) of compressors 1 and 2 are increased to a command frequency (based on the total sum of the required cooling capacities).

With this operation, compressors 1 and 2 are operated with the capacities corresponding to the total sum of the required cooling capacities of the respective indoor units.

Note that multi-controller 60 controls the openings of refrigerant flow control valves 11, 21, and 31 in accordance with the frequency setting signals from the respective indoor units. Thus, an optimal amount of refrigerant corresponding to a required cooling capacity of each indoor unit is flowed into each indoor heat exchanger. In addition, the degree of overheating of the refrigerant in each indoor heat exchanger is controlled to be constant by a corresponding one of expansion valves 12, 22, and 32.

As described above, when the single compressor operation is to be switched to the parallel compressor operation, the frequency of compressor 1, which has been set in a drive state, is decreased, so that the high-pressure-side pressure in the refrigerant cycle is dropped. By starting compressor 2 in this state, the starting load of compressor 2 can be minimized. As a result, compressor 2 can be reliably and smoothly started. That is, a stable operation can be performed.

In addition, since oil return paths such as oil separators are attached to compressors 1 and 2, refrigeration oil can be efficiently collected. Especially while the operating frequencies of compressors 1 and 2 are shifted to a command operating frequency upon starting of compressor 2, the refrigeration oil is flowed through compressors 1 and 2 via tube 45. Therefore, a shortage of oil and a locked state of a compressor associated therewith can be prevented.

Figure 5:
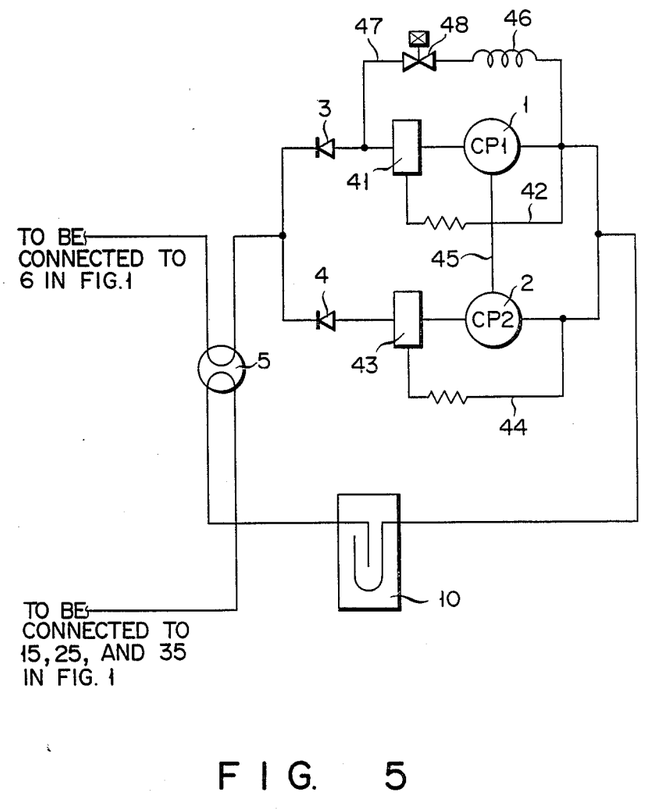
FIG. 5 is a block diagram showing an arrangement of a main part of a refrigeration cycle according to a second embodiment of the present invention.
Figure 6:
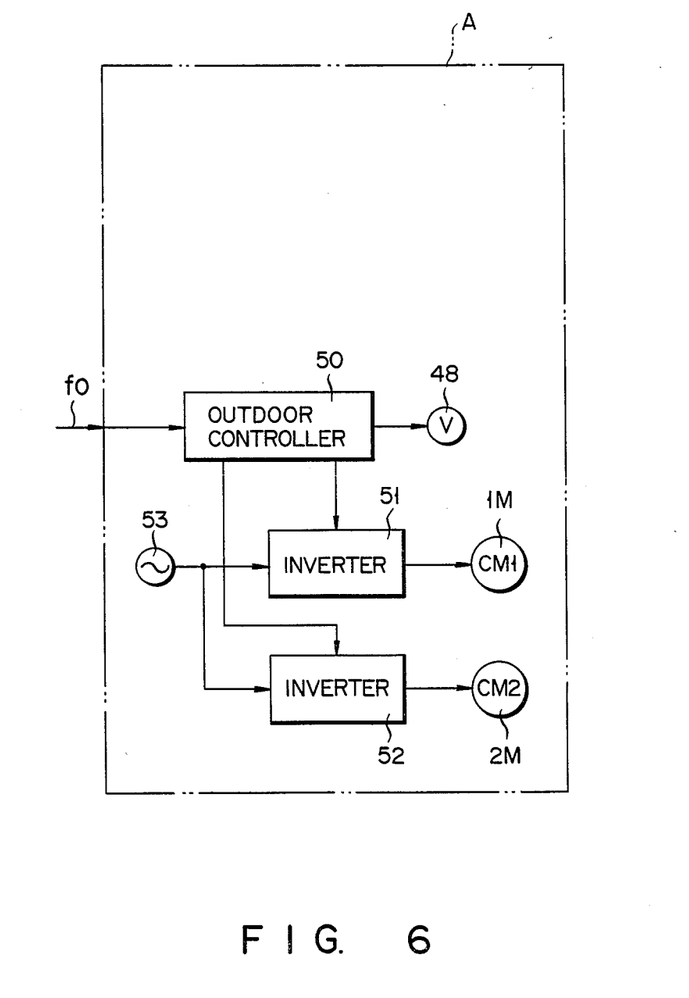
FIG. 6 is a block diagram showing an arrangement of a main part of a control circuit of the second embodiment.

FIGS. 5 and 6 show a second embodiment. Since FIGS. 5 and 6 show main parts of the second embodiment, and other parts are the same as those in FIGS. 1 and 2, a drawing and a description thereof will be omitted.

Refrigerant bypass tube 47 is arranged between the refrigerant delivery- and intake-side tubes of compressor 1 through capillary tube 46. Solenoid valve 48 is attached to refrigerant bypass tube 47. Then, solenoid valve 48 is connected to outdoor controller 50.

Figure 7:
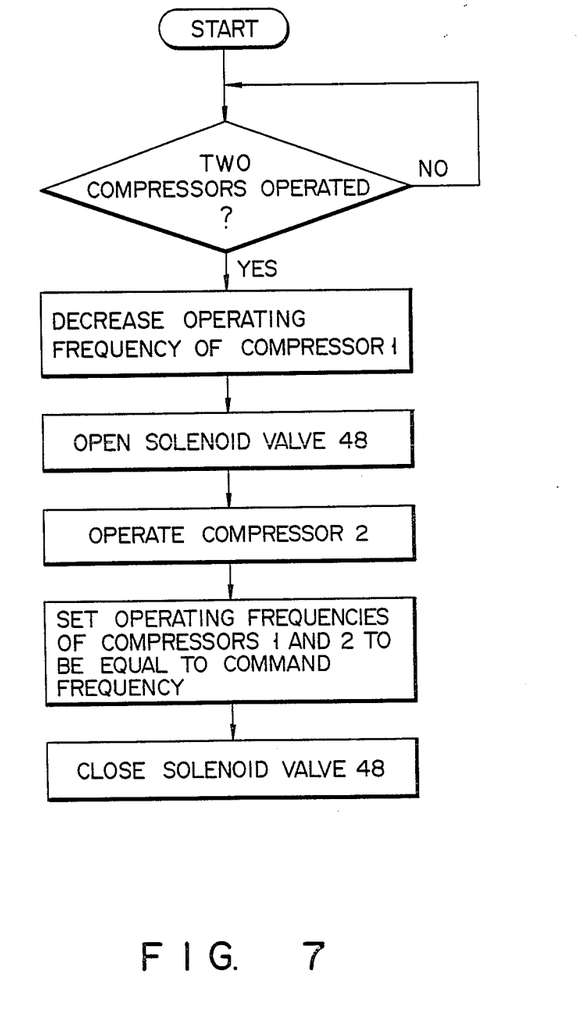
FIG. 7 is a flow chart for explaining an operation of the second embodiment.

With this arrangement, when the single compressor operation is switched to the parallel compressor operation, the operating frequency of compressor 1 is decreased, and at the same time solenoid valve 48 is opened, thereby balancing the pressures of the high-pressure and low-pressure sides, as shown in FIG. 7. With this operation, the starting load of compressor 2 can be further reduced, and hence the starting performance is greatly improved.

In the above-described embodiments, a description is made on the case where the number of indoor units is three. However, in a case wherein more compressors or two compressors are used, the present invention can be practiced in the same manner as in the above-described embodiments. Thus, the present invention is not limited to the particular embodiments described above. Various changes and modifications thereto being possible without departing from the spirit and scope of the invention.

As has been described above, according to the present invention, the number of compressors to be operated and their capacities are controlled in accordance with required capacities of the respective indoor units. In addition, when the single compressor operation is switched to the parallel compressor operation, the frequency of one compressor, which has been set in a drive state, is decreased, and then the other compressor is started in this state. As a result, the second compressor can be reliably and smoothly started, thereby providing a multi-type air conditioner system constantly realizing a stable operation.

What is claimed is:

1. A multi-type air conditioner apparatus, comprising:
an outdoor unit having at least two variable-capacity compressors, an outdoor heat exchanger to which said two compressors are commonly coupled, and bypass means including a solenoid valve between a refrigerant intake side and a delivery side of one of said variable-capacity compressors;
a plurality of indoor units, each having at least an indoor heat exchanger and detecting means for detecting an air conditioning load of said indoor heat exchanger, to output required capacity data;
a distribution unit for coupling said outdoor unit in parallel with said plurality of indoor units, so as to constitute each refrigerant cycle, said distribution unit having a plurality of refrigerant flow control means for each refrigerant cycle;
first control means, for supplying a control command based on required capacity data from said plurality of indoor units to said refrigerant flow control means of said distribution unit, and outputting total sum data of the respective required capacity data;
second control means, for supplying a single operation command with a predetermined capacity by one of said two variable-capacity compressors to said outdoor unit when said total sum data from said first control means is smaller than a predetermined value, and supplying a parallel operation command with predetermined capacities by both said two variable-capacity compressors to said outdoor unit when the total sum data is larger than said predetermined value; and
third control means, for supplying a command for setting said solenoid valve in an open state for temporarily decreasing from said predetermined capacity one of said two variable-capacity compressors to said outdoor unit and thereafter supply a command for starting another of said two variable-capacity compressors to said outdoor unit when said single operation command supplied from said second control means is switched to a parallel operation command, thus allowing said another of said two variable-capacity compressors to start while the operation frequency of said one compressor is decreased.

2. An apparatus according to claim 1, wherein said two variable-capacity compressors are coupled in parallel through check valves respectively connected to refrigerant delivery sides of said two variable-capacity compressors.

3. An apparatus according to claim 2, wherein said outdoor unit further comprises oil separators arranged between the respective refrigerant delivery sides of said two variable-capacity compressors and said check valves, a plurality of oil bypass means extending from said oil separators to refrigerant intake sides of said two variable-capacity compressors.

4. An apparatus according to claim 3, wherein said outdoor unit comprises means for equally supplying an oil causing bottom portions of said two variable-capacity compressors to communicate with each other.

5. An apparatus according to claim 1, wherein said outdoor unit further comprises a 4-way valve, a parallel connection of a heating expansion valve and a cooling cycle check valve, a liquid tank, and an accumulator.

6. An apparatus according to claim 1, wherein said distribution unit further comprises parallel connections of a plurality of cooling expansion valves and a plurality of heating cycle check valves, and a plurality of gas-side valves.

7. An apparatus according to claim 1, wherein each of said detecting means comprises an operation unit for setting an indoor temperature, a temperature sensor for detecting an indoor temperature, and an indoor controller for calculating a difference between a set temperature set by said operation unit and a detection temperature detected by said temperature sensor, and outputting the required capacity data corresponding to the difference in temperature.

8. An apparatus according to claim 7, wherein said indoor controller comprises a microcomputer and a peripheral circuit thereof.

9. An apparatus according to claim 1, wherein the command for decreasing the predetermined capacity from said third control means is a command for decreasing the predetermined capacity of one of said variable-capacity compressors to a minimum capacity.

10. An apparatus according to claim 1, wherein said first control means is arranged as a multi-controller in said distribution unit.

11. An apparatus according to claim 10, wherein said multi-controller comprises a microcomputer and a peripheral circuit thereof.

12. An apparatus according to claim 1, wherein said second and third control means are arranged as an outdoor controller in said outdoor unit.

13. An apparatus according to claim 12, wherein said outdoor controller comprises a microcomputer and a peripheral circuit thereof, and is connected to motors of said two variable-capacity compressors via two externally connected inverters.

14. An apparatus according to claim 1, wherein the required capacity data and the total sum data are frequency setting signals.

15. A method of controlling an air conditioner system including an outdoor unit having at least two variable capacity-compressors, an outdoor heat exchanger to which said two compressors are commonly coupled, and bypass means including a solenoid valve between a refrigerant intake side and a delivery side of one of said variable-capacity compressors; a plurality of indoor units each having at least an indoor heat exchanger and detecting means for detecting an air conditioning load of said indoor heat exchanger to output required capacity data; and a distribution unit for coupling said outdoor and in parallel with said plurality of indoor units, so as to constitute each refrigerant cycle, said distribution unit having a plurality of refrigerant flow control means for each refrigerant cycle; and method comprising the steps of:

supplying a control command based on required capacity data from said plurality of indoor units to said refrigerant flow control means of said distribution unit;

outputting a total sum of the respective required capacity data;

supplying a single operation command with a predetermined capacity by one of said variable-capacity compressors to said outdoor unit when said total sum data is smaller than a predetermined valve;

supplying a parallel operation command with predetermined capacities by both said two-variable capacity compressors to said outdoor unit when the total sum data is larger than said predetermined value;

supplying a parallel operation command with predetermined capacities by both said two-variable capacity compressors to said outdoor unit when the total sum data is larger than said predetermined value;

supplying a command for setting said solenoid valve is an open state for temporarily decreasing from said predetermined capacity one of said two variable-capacity compressors to said outdoor unit;

thereafter supplying a starting command for starting another of said two variable-capacity compressors to said outdoor unit when said single operation command is switched to a parallel operation command, thus allowing said another of said two variable-capacity compressors to start while the operating frequency of said one compressor is decreased.

* * * * *